United States Patent
Go

(10) Patent No.: US 11,485,224 B2
(45) Date of Patent: Nov. 1, 2022

(54) VEHICLE-MOUNTED SOLAR POWER GENERATION DEVICE

(71) Applicant: TOYOTA JIDOSHA KABUSHIKI KAISHA, Toyota (JP)

(72) Inventor: Koichi Go, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 355 days.

(21) Appl. No.: 16/690,270

(22) Filed: Nov. 21, 2019

(65) Prior Publication Data

US 2020/0231036 A1 Jul. 23, 2020

(30) Foreign Application Priority Data

Jan. 21, 2019 (JP) .............................. JP2019-007589

(51) Int. Cl.
*B60K 16/00* (2020.01)
*B60L 8/00* (2006.01)
*H02J 7/35* (2006.01)
*H02S 40/38* (2014.01)

(52) U.S. Cl.
CPC .............. *B60K 16/00* (2013.01); *B60L 8/003* (2013.01); *H02J 7/35* (2013.01); *H02S 40/38* (2014.12); *B60K 2016/003* (2013.01)

(58) Field of Classification Search
CPC ... B60K 16/00; B60K 2016/003; B60L 8/003; H02S 40/38; H02J 7/35
See application file for complete search history.

(56) References Cited

U.S. PATENT DOCUMENTS

| 9,787,170 | B2 * | 10/2017 | Inoue | ...................... H02M 1/10 |
| 10,320,226 | B2 * | 6/2019 | Takahashi | ............. H01L 31/042 |
| 2018/0026474 | A1 | 1/2018 | Takahashi et al. | |

FOREIGN PATENT DOCUMENTS

| JP | 2014-36563 | A | 2/2014 |
| JP | 2014-217218 | A | 11/2014 |
| JP | 2016-96647 | A | 5/2016 |
| JP | 5969575 | B2 | 8/2016 |
| JP | 2016-163473 | A | 9/2016 |
| JP | 6394652 | B2 | 9/2018 |

* cited by examiner

*Primary Examiner* — John D Walters
(74) *Attorney, Agent, or Firm* — Oblon, McClelland, Maier & Neustadt, L.L.P.

(57) ABSTRACT

A vehicle-mounted solar power generation device includes a solar panel, a solar battery that is a battery temporarily storing electric power, and a controller configured to perform control by switching between an electric power generation mode in which the solar battery is charged with a generated electric power of the solar panel and an electric power saving mode in which at least the charging of the solar battery is stopped such that power consumption is suppressed in comparison with the electric power generation mode. The controller determines to switch between modes based on the output voltage of the solar panel. In the electric power saving mode, the controller restricts a switch to the electric power generation mode based on any of the frequency of switching between modes, the amount of electric power stored in the solar battery, and the state of stoppage of a vehicle.

6 Claims, 4 Drawing Sheets

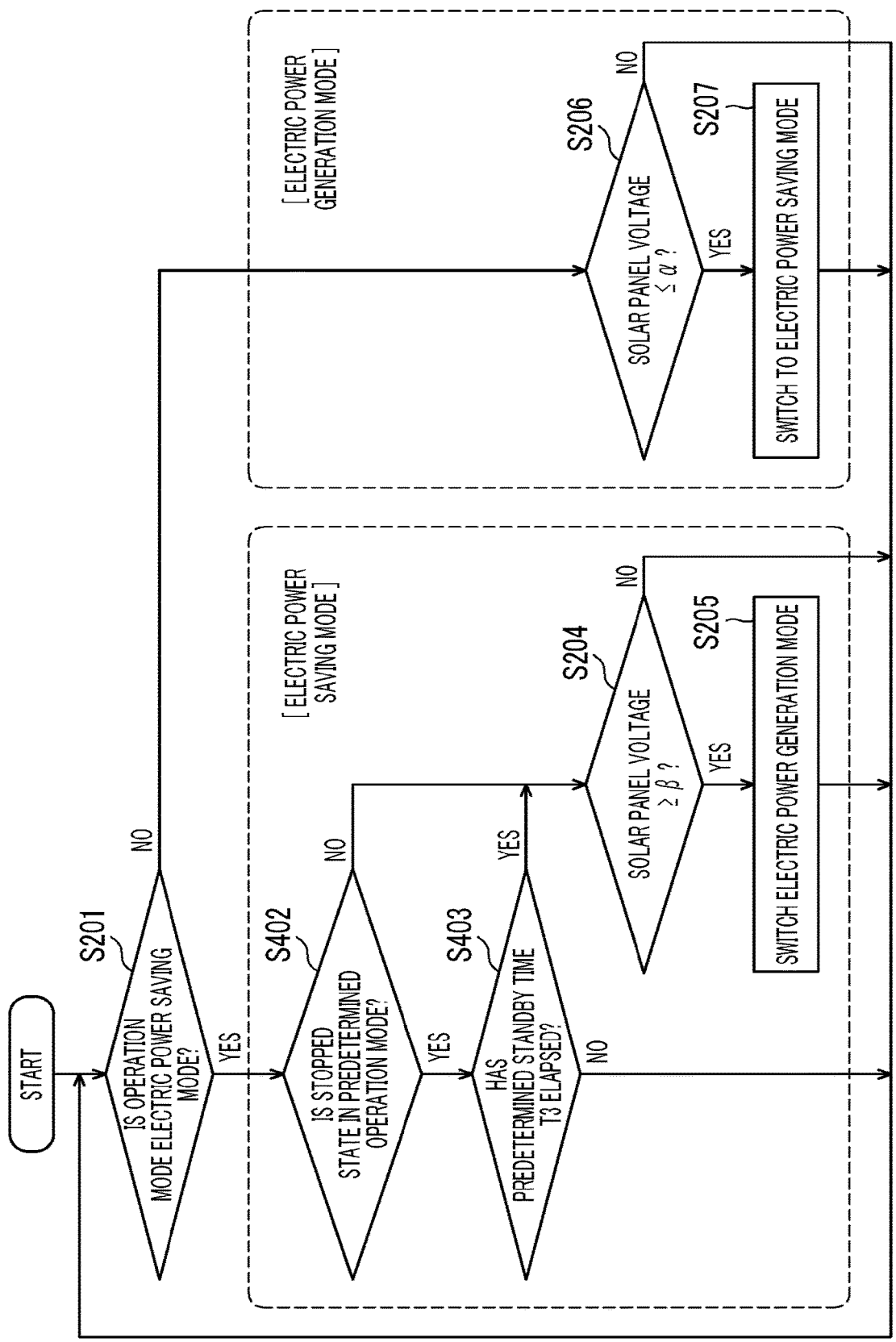

VEHICLE-MOUNTED SOLAR POWER GENERATION DEVICE

INCORPORATION BY REFERENCE

The disclosure of Japanese Patent Application No. 2019-007589 filed on Jan. 21, 2019 including the specification, drawings and abstract is incorporated herein by reference in its entirety.

BACKGROUND

1. Technical Field

The present disclosure relates to a solar power generation device that is installed in a vehicle.

2. Description of Related Art

Japanese Patent No. 6394652 (JP 6394652 B) discloses a system in which a switch between an electric power generation mode, in which a predetermined circuit (DC-to-DC converter or like) is operated such that generated electric power of a solar panel is stored into a solar battery, and an electric power saving mode, in which the predetermined circuit is stopped such that power consumption is reduced, is controlled based on the magnitude of generated electric power and output voltage of the solar panel.

In the case of the system described in JP 6394652 B, transition to the electric power saving mode is made when a determination is made that the generated electric power of the solar panel has remained equal to or lower than a threshold value for a predetermined time and transition to the electric power generation mode is made when a determination is made that the open-end of the solar panel has reached a standard voltage, which is set at the time of the transition to the electric power saving mode, again and has been maintained for a predetermined time. Accordingly, a recovery to generated electric power corresponding to a temperature environment of the solar panel can be appropriately determined based on the open-end voltage of the solar panel solely.

SUMMARY

In the case of the system described in JP 6394652 B, transition from the electric power saving mode to the electric power generation mode is made when generated electric power of the solar panel is recovered. However, in a case where the solar panel is under a weak-light environment in which the amount of solar radiation is small or the like, even when generated electric power of the solar panel is recovered and transition to the electric power generation mode is made, there is a possibility that the generated electric power of the solar panel immediately becomes equal to or lower than the threshold value due to the influence of a decrease in output voltage of the solar panel, which is caused by the DC-to-DC converter being operated, and transition to the electric power saving mode is made again. That is, under a weak-light environment, there is a possibility that a switch between the electric power generation mode and the electric power saving mode is made frequently.

The present disclosure provides a vehicle-mounted solar power generation device with which it is possible to restrain a switch between an electric power generation mode and an electric power saving mode from being frequently made even under a weak-light environment.

An aspect of the present disclosure relates to a vehicle-mounted solar power generation device including a solar panel, a solar battery, and a controller. The solar battery is a battery temporarily storing electric power. The controller is configured to perform control by switching between an electric power generation mode in which the solar battery is charged with a generated electric power of the solar panel and an electric power saving mode in which at least the charging of the solar battery is stopped such that power consumption is suppressed in comparison with the electric power generation mode. The controller determines to switch between modes based on the output voltage of the solar panel. In the electric power saving mode, the controller restricts a switch to the electric power generation mode based on any of the frequency of switching between modes, the amount of electric power stored in the solar battery, and the state of stoppage of a vehicle.

In the case of the vehicle-mounted solar power generation device according to the aspect of the present disclosure, since determination on whether to switch between modes is made based on any of the number of times of switching from the electric power generation mode to the electric power saving mode, the amount of electric power stored in the solar battery, and the state of stoppage of the vehicle in addition to the output voltage of the solar panel, it is possible to restrain a switch between the electric power generation mode and the electric power saving mode from being frequently made even under a weak-light environment.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4 is a flowchart of an electric power charging control process according to a third example which is performed by a controller.

DETAILED DESCRIPTION OF EMBODIMENTS

In an electric power saving mode of a vehicle-mounted solar power generation device according to the present disclosure, a switch from the electric power saving mode to an electric power generation mode is prohibited for a certain time in a case where it is estimated that a solar panel is under a weak-light environment, in which the amount of solar radiation is small or the like, based on any of the number of times of switching from electric power generation mode to the electric power saving mode, the amount of electric power stored in a solar battery, and the state of stoppage of a vehicle in addition to output voltage of the solar panel. Accordingly, even under a weak-light environment, it is possible to restrain a switch between the electric power generation mode and the electric power saving mode from being made frequently and consecutively.

Embodiment

Hereinafter, an embodiment of the present disclosure will be described in detail with reference to drawings.

Configuration

Figure 1:
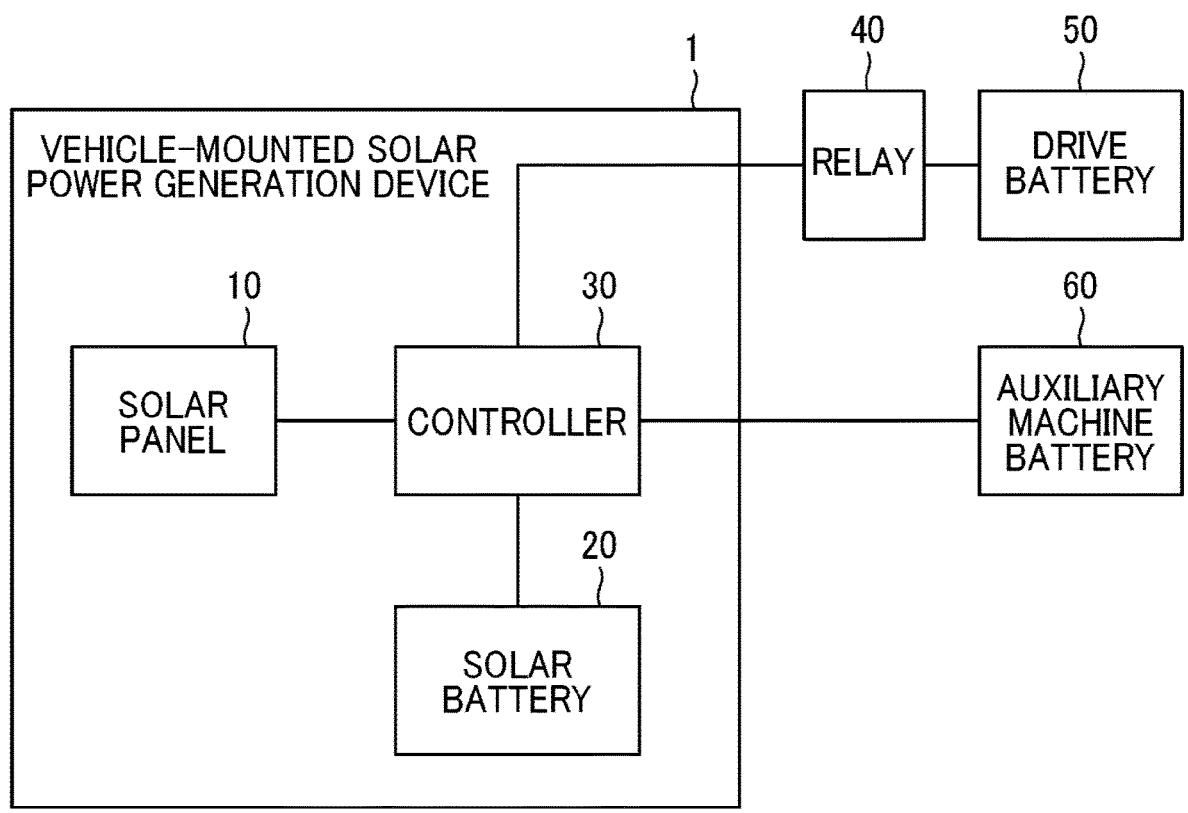
FIG. 1 is a diagram illustrating the configuration of a system to which a vehicle-mounted solar power generation device according to an embodiment of the present disclosure is applied.

FIG. 1 is a block diagram illustrating the configuration of a system to which a vehicle-mounted solar power generation device 1 according to the embodiment of the present disclosure is applied. The system shown in FIG. 1 is provided with the vehicle-mounted solar power generation device 1 including a solar panel 10, a solar battery 20, and a controller 30, a relay 40, a drive battery 50, and an auxiliary machine battery 60.

The solar panel 10 is a solar battery module, which is an assembly of solar battery cells which generate electric power when receiving sunlight emitted thereto. The amount of electric power generated in the solar panel 10 depends on the intensity of solar radiation. Electric power generated in the solar panel 10 is output to the controller 30. The solar panel 10 can be installed on a roof of the vehicle, for example.

The solar battery 20 is an electric power storing element configured to be rechargeable and dischargeable, examples of the electric power storing element including a lithium battery and a nickel-hydrogen battery. The solar battery 20 is a battery for temporarily storing electric power generated in the solar panel 10 and is connected to the controller 30 such that the solar battery 20 can be charged with electric power generated in the solar panel 10 and electric power stored in the solar battery 20 can be supplied to the drive battery 50 or the auxiliary machine battery 60.

The drive battery 50 is an electric power storing element configured to be rechargeable and dischargeable, examples of the electric power storing element including a lithium battery and a nickel-hydrogen battery. The drive battery 50 is connected to the controller 30 via the relay 40 such that the drive battery 50 can be charged with electric power generated in the solar panel 10 and can be charged with electric power stored in the solar battery 20. The drive battery 50 is connected to a predetermined machine (not shown) for driving the vehicle and supplies electric power needed to operate the machine.

The auxiliary machine battery 60 is an electric power storing element configured to be rechargeable and dischargeable, examples of the electric power storing element including a lead storage battery. The auxiliary machine battery 60 is connected to the controller 30 such that the auxiliary machine battery 60 can be charged with electric power generated in the solar panel 10 and can be charged with electric power stored in the solar battery 20. The auxiliary machine battery 60 is connected to an auxiliary machine (not shown) of the vehicle and supplies electric power needed to operate the auxiliary machine.

The controller 30 is connected to each of the solar panel 10, the solar battery 20, the drive battery 50, and the auxiliary machine battery 60 and is an electronic control unit (ECU) that can control the charging of each battery with electric power generated in the solar panel 10 and supply of the electric power to each battery. The controller 30 includes a DC-to-DC converter and can convert the voltage of electric power generated in the solar panel 10 into a predetermined voltage (perform increase or decrease in voltage) and can store the electric power into the solar battery 20. In addition, the controller 30 can convert the voltage of electric power stored in the solar battery 20 into the predetermined voltage (perform increase or decrease in voltage) and can supply the electric power to the drive battery 50 and the auxiliary machine battery 60. In addition, the controller 30 can control connection and disconnection of the relay 40.

The controller 30 monitors the state of electric power generation of the solar panel 10 and the state of charge of the solar battery 20 and switches the operation mode of the vehicle-mounted solar power generation device 1 between an electric power generation mode and an electric power saving mode based on the states.

The electric power generation mode is an operation mode in which electric power generated in the solar panel 10 is stored in the solar battery 20. The electric power generation mode continues until the output voltage of the solar panel 10 becomes equal to or lower than a predetermined threshold value α such that electric power obtained by solar radiation to the solar panel 10 can be efficiently stored in the solar battery 20.

The electric power saving mode is an operation mode in which a part of the functions of the controller 30 (typically, DC-to-DC converter (not shown) which operates when receiving electric power supplied from solar battery 20) is stopped such that a process of storing, into the solar battery 20, electric power generated in the solar panel 10 is not performed. The electric power saving mode continues until the output voltage of the solar panel 10 becomes equal to or greater than a predetermined threshold value β in accordance with a predetermined condition or a predetermined standby time such that extraction of electric power from the solar battery 20 can be avoided. Note that, the threshold value α, the threshold value β, the predetermined condition, and the predetermined standby time will be described later.

Control

Figure 2:
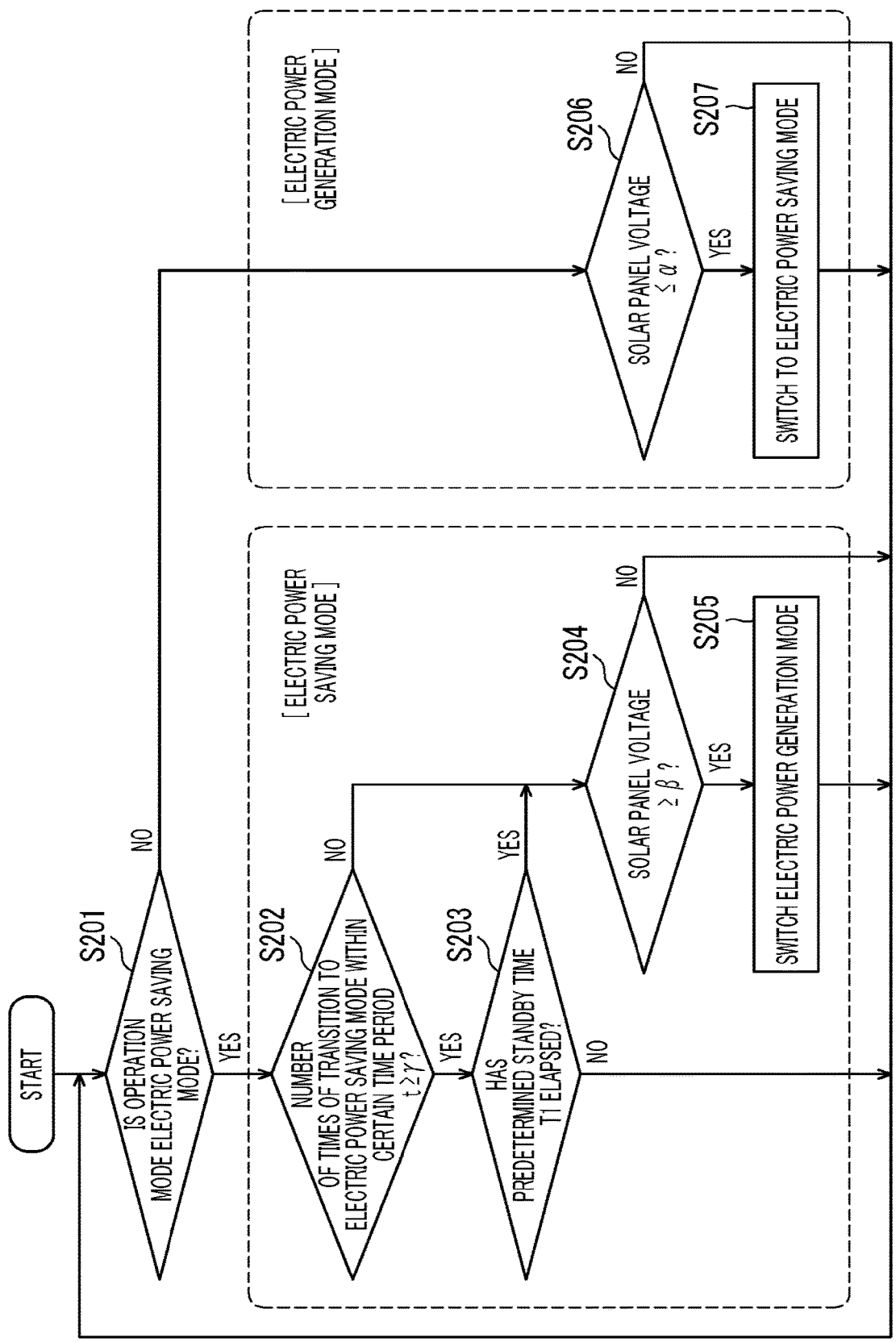
FIG. 2 is a flowchart of an electric power charging control process according to a first example which is performed by a controller.
Figure 3:
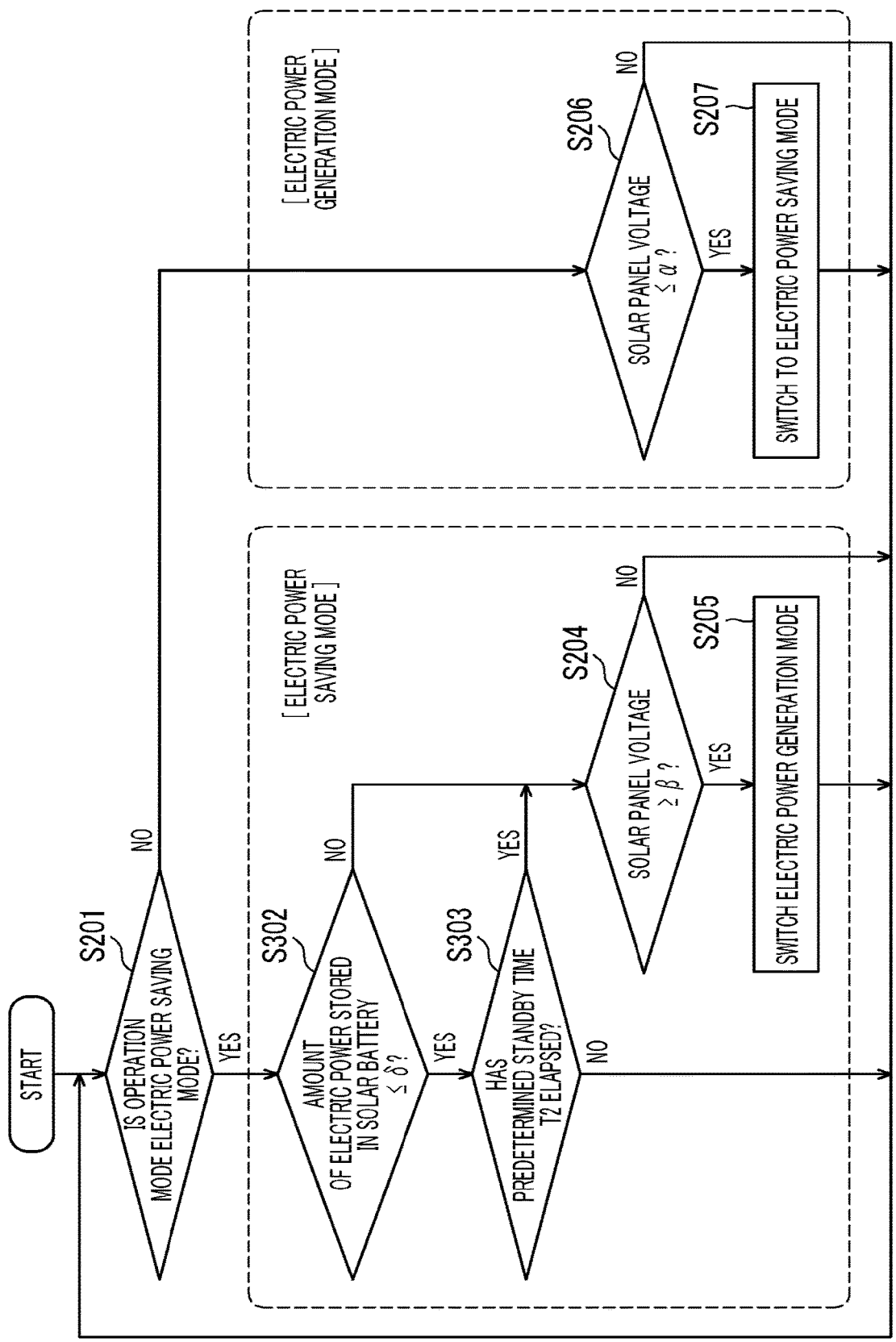
FIG. 3 is a flowchart of an electric power charging control process according to a second example which is performed by a controller.

Next, control performed by the vehicle-mounted solar power generation device 1 according to the embodiment of the present disclosure will be described with reference to FIG. 2 as well. FIG. 2 is a flowchart for describing the procedure for electric power charging control according to a first example which is performed by the controller 30 of the vehicle-mounted solar power generation device 1. FIG. 3 is a flowchart for describing the procedure for electric power charging control according to a second example which is performed by the controller 30 of the vehicle-mounted solar power generation device 1. FIG. 4 is a flowchart for describing the procedure for electric power charging control according to a third example which is performed by the controller 30 of the vehicle-mounted solar power generation device 1.

The electric power charging control shown in each of FIG. 2, FIG. 3, and FIG. 4 is repeatedly performed while the vehicle-mounted solar power generation device 1 is being operated.

First Example

Step S201: The controller 30 determines whether the current operation mode of the vehicle-mounted solar power generation device 1 is the electric power saving mode or not. Note that, any of the electric power saving mode and the electric power generation mode may be set in advance as a default operation mode immediately after the operation of the vehicle-mounted solar power generation device 1 and the default operation mode may be set depending on a situation based on the amount of electric power stored in the solar battery 20 at a time immediately after the operation of the vehicle-mounted solar power generation device 1.

In a case where the operation mode is the electric power saving mode (step S201: YES), the process proceeds to step S202. Meanwhile, in a case where the operation mode is the electric power generation mode (step S201: NO), the charging of the solar battery 20 with generated electric power of the solar panel 10 is started or continued and the process proceeds to step S206.

Step S202: In the electric power saving mode, the controller 30 performs, as determination on whether the predetermined condition is satisfied or not, determination on whether the number of times of switching from the electric power generation mode to the electric power saving mode (hereinafter, referred to as "number of times of transition to electric power saving mode") within a certain time period t is equal to or greater than a predetermined number γ or not based on the number of times of transition to the electric power saving mode made so far. The determination is performed in order to estimate whether the solar panel 10 (that is, vehicle) is under a weak-light environment, in which the amount of solar radiation is small or the like, or not. It cannot be expected that the solar panel 10 stably generates electric power under a weak-light environment. Therefore, under a weak-light environment, it is expected that a switch between the electric power generation mode and the electric power saving mode is frequently repeated due to a temporal change in solar radiation, shade, or the like. Therefore, in step S202, determination on whether the solar panel 10 is under a weak-light environment or not is made based on whether the number of times that the operation mode of the vehicle-mounted solar power generation device 1 has been switched from the electric power generation mode to the electric power saving mode is large or small. Note that, the certain time period t and the predetermined number γ are variables used for determination on whether the solar panel 10 is under a weak-light environment or not and can be randomly set in accordance with the electric power generation capacity or the performance of the solar panel 10.

In a case where the number of times of transition to the electric power saving mode made within the certain time period t is equal to or greater than the predetermined number γ (step S202: YES), a determination is made that a switch from the electric power generation mode to the electric power saving mode has been frequently repeated and the process proceeds to step S203. Meanwhile, in a case where the number of times of transition to the electric power saving mode made within the certain time period t is smaller than the predetermined number γ (step S202: NO), a determination is made that a switch from the electric power generation mode to the electric power saving mode has not been frequently repeated and the process proceeds to step S204.

Step S203: The controller 30 determines whether or not a predetermined standby time T1 has elapsed after the controller 30 determines that the number of times of transition to the electric power saving mode made within the certain time period t is equal to or greater than the predetermined number γ in step S202. The determination is performed to restrict (prohibit) a switch between operation modes made in the standby time T1 such that a switch between the electric power generation mode and the electric power saving mode is not continuously repeated. The standby time T1 can be randomly set in accordance with the functions and specifications of the vehicle or a performance requisite for the vehicle-mounted solar power generation device 1.

In a case where the standby time T1 has elapsed (S203: YES), the process proceeds to step S204. In a case where the controller 30 determines that the standby time T1 has not elapsed (S203: NO), the process proceeds to step S201.

Step S204: The controller 30 determines whether the output voltage of the solar panel 10 (hereinafter, referred to as "solar panel voltage") is equal to or greater than the predetermined threshold value β or not. The determination is performed to determine whether electric power is being generated by the solar panel 10 to such an extent that a switch in operation mode from the electric power saving mode to the electric power generation mode causes no problem. For example, in a case where the generated electric power of the solar panel 10 is smaller than power consumption needed to operate the DC-to-DC converter, even when the DC-to-DC converter is newly activated and an electric power charging process is started, extraction of electric power from the solar battery 20 occurs and there is a decrease in amount of electric power stored therein, which is not desirable. Therefore, the threshold value β can be set to be equal to or greater than the solar panel voltage that appears at an output terminal in a case where electric power equal to or greater than electric power needed to operate the DC-to-DC converter is generated by the solar panel 10.

In a case where the solar panel voltage is equal to or greater than the threshold value β (S204: YES), the process proceeds to step S205. In a case where the solar panel voltage is lower than the threshold value β (S204: NO), the process proceeds to step S201.

Note that, the threshold value β may be set based on the voltage of the solar battery 20, may be set based on the open-end voltage of the solar panel 10 at the time of a switch each time a switch from the electric power generation mode to the electric power saving mode is made, and may be set based on both of the voltage of the solar battery 20 and the open-end voltage of the solar panel 10. In addition, in step S204, the process may proceed to step S205 after the controller 30 determines that a state where the solar panel voltage is equal to or greater than the threshold value β has continued for a predetermined time such that the influence of a short-time increase in generated electric power of the solar panel 10, which is caused by momentary insertion of solar light, is eliminated.

Step S205: The controller 30 switches the operation mode of the vehicle-mounted solar power generation device 1 to the electric power generation mode from the electric power saving mode. Accordingly, the charging of the solar battery 20 with the generated electric power of the solar panel 10 is started. When the operation mode is switched, the process proceeds to step S206 through step S201.

Step S206: The controller 30 determines whether the solar panel voltage is equal to or lower than the predetermined threshold value α in the electric power generation mode or not. The determination is performed to determine whether electric power is not being generated by the solar panel 10 to such an extent that a switch in operation mode from the electric power generation mode to the electric power saving mode becomes preferable. For example, when the electric power charging process is continuously performed by means of the DC-to-DC converter while the generated electric power of the solar panel 10 is greater than power consumption needed to operate the DC-to-DC converter, electric power is stored into the solar battery 20 and there is an increase in amount of electric power stored in the solar battery 20, which is efficient. Therefore, the threshold value α can be set to be equal to or greater than the solar panel voltage that appears at the output terminal in a case where electric power equal to or greater than electric power needed to operate the DC-to-DC converter is generated by the solar panel 10.

In a case where the solar panel voltage is equal to or lower than the threshold value α (S206: YES), the process proceeds to step S207. In a case where the solar panel voltage exceeds the threshold value θ (S206: NO), the process proceeds to step S201.

Note that, the controller 30 may determine to switch the operation mode from the electric power generation mode to the electric power saving mode based on whether the voltage of the solar battery 20 is lower than a predetermined reference voltage or not, whether the generated electric power of the solar panel 10 is smaller than a predetermined reference electric power or not, or both of whether the voltage of the solar battery 20 is lower than a predetermined reference voltage or not and whether the generated electric power of the solar panel 10 is smaller than a predetermined reference electric power or not instead of whether the solar panel voltage is equal to or lower than the threshold value α or not. In addition, in step S206, the process may proceed to step S207 after the controller 30 determines that a state where the solar panel voltage is equal to or lower than the threshold value α has continued for a predetermined time such that the influence of a short-time decrease in generated electric power of the solar panel 10, which is caused by solar light momentarily clouded, is eliminated. Note that, the threshold value α may be the same value as the threshold value β and may be a value different from the threshold value β.

Step S207: The controller 30 switches the operation mode of the vehicle-mounted solar power generation device 1 to the electric power saving mode from the electric power generation mode. Accordingly, the charging of the solar battery 20 with the generated electric power of the solar panel 10 is stopped. When the operation mode is switched, the process proceeds to step S202 through step S201.

In the case of the above-described process, it is possible to restrain a switch between the electric power generation mode and the electric power saving mode from being made frequently and consecutively based on the number of times of transition to the electric power saving mode even in a case where the solar panel 10 is under a weak-light environment.

Second Example

A second example is different from the first example in a point that steps S202 and S203 in the first example are substituted with steps S302 and S303. Hereinafter, the second example will be described focusing on processes in the steps different from those in the first example.

Step S201: The controller 30 determines whether the current operation mode of the vehicle-mounted solar power generation device 1 is the electric power saving mode or not. In a case where the operation mode is the electric power saving mode (step S201: YES), the process proceeds to step S302. In a case where the operation mode is the electric power generation mode (step S201: NO), the process proceeds to step S206.

Step S302: In the electric power saving mode, the controller 30 performs, as determination on whether the predetermined condition is satisfied or not, determination on whether the amount of electric power stored in the solar battery 20 is equal to or smaller than a predetermined amount δ or not based on the amount of electric power stored in the solar battery 20. The determination is performed in order to estimate whether the solar panel 10 (that is, vehicle) is under a weak-light environment or not. It cannot be expected that the solar panel 10 stably generates electric power under a weak-light environment. Therefore, under a weak-light environment, it is expected that power consumption of the DC-to-DC converter becomes greater than the generated electric power of the solar panel 10, extraction of electric power from the solar battery 20 becomes great, and the amount of electric power stored in the solar battery 20 gradually decreases in a case where the vehicle-mounted solar power generation device 1 is operated in the electric power generation mode. Therefore, in step S302, determination on whether the solar panel 10 is under a weak-light environment or not is made based on whether the amount of electric power stored in the solar battery 20 is large or small. Note that, the predetermined amount δ is a variable for determination on whether the solar panel 10 is under a weak-light environment or not and can be randomly set in accordance with the electric power storage capacity of the solar battery 20.

In a case where the amount of electric power stored in the solar battery 20 is equal to or smaller than the predetermined amount δ (step S302: YES), a determination is made that the solar panel 10 is under a weak-light environment and the process proceeds to step S303. Meanwhile, in a case where the amount of electric power stored in the solar battery 20 exceeds the predetermined amount δ (step S302: NO), a determination is made that the solar panel 10 is not under a weak-light environment and the process proceeds to step S204.

Step S303: The controller 30 determines whether or not a predetermined standby time T2 has elapsed after the controller 30 determines that the amount of electric power stored in the solar battery 20 is equal to or smaller than the predetermined amount δ in step S302. The determination is performed to restrict (prohibit) a switch between operation modes made in the standby time T2 such that a switch between the electric power generation mode and the electric power saving mode is not continuously repeated. The standby time T2 can be randomly set in accordance with the functions and specifications of the vehicle or a performance requisite for the vehicle-mounted solar power generation device 1. Note that, the length of the standby time T2 may be equal to the length of the standby time T1 and may be different from the length of the standby time T1.

In a case where the standby time T2 has elapsed (S303: YES), the process proceeds to step S204. In a case where the standby time T2 has not elapsed (S303: NO), the process proceeds to step S201.

In the case of the above-described process, it is possible to restrain a switch between the electric power generation mode and the electric power saving mode from being made frequently and consecutively based on the amount of electric power stored in the solar battery 20 even in a case where the solar panel 10 is under the weak-light environment.

Third Example

A third example is different from the first example in a point that steps S202 and S203 in the first example are substituted with steps S402 and S403. Hereinafter, the third example will be described focusing on processes in the steps different from those in the first example.

Step S201: The controller 30 determines whether the current operation mode of the vehicle-mounted solar power generation device 1 is the electric power saving mode or not. In a case where the operation mode is the electric power saving mode (step S201: YES), the process proceeds to step S402. In a case where the operation mode is the electric power generation mode (step S201: NO), the process proceeds to step S206.

Step S402: In the electric power saving mode, the controller 30 performs, as determination on whether the predetermined condition is satisfied or not, determination on whether the vehicle is in a stopped state in a predetermined operation mode based on the state of stoppage of the vehicle. The determination is performed in order to estimate whether the solar panel 10 (that is, vehicle) is under a situation in which the solar panel 10 is likely to be left under a weak-light environment for a long period of time. The meaning of the expression "to be in a stopped state in the predetermined operation mode" is "to be in a stopped state for a predetermined time or more under a situation where the solar panel 10 does not generate electric power" and examples thereof include a case where the vehicle is stopped and parked at a garage with a roof and a case where the vehicle and a house are vehicle-to-home (V2H) connected to each other such that electric power stored in the drive battery 50 or the like is supplied as electric power for family use. In a case where the vehicle is in a stopped state in such an operation mode, the possibility of an immediate change from a current situation in which the solar panel 10 does not generate electric power to a situation in which electric power can be generated is low. Therefore, in step S402, determination on whether the solar panel 10 is under a situation in which the solar panel 10 is likely to be left under a weak-light environment for a long period of time or not is made based on the state of stoppage of the vehicle. Note that, the state of stoppage of the vehicle can be determined based on the state of an electric power source of the vehicle or information acquired from a system other than the vehicle-mounted solar power generation device 1.

In a case where the vehicle is in a stopped state in the predetermined operation mode (step S402: YES), a determination is made that there is no possibility of an immediate change in electric power generation situation and the process proceeds to step S403. Meanwhile, in a case where the vehicle is not in a stopped state in the predetermined operation mode (step S402: NO), a determination is made that there is a possibility of an immediate change in electric power generation situation and the process proceeds to step S204.

Step S403: The controller 30 determines whether or not a predetermined standby time T3 has elapsed after the controller 30 determines that the vehicle is in a stopped state in the predetermined operation mode in step S402.
The determination is performed to restrict (prohibit) a switch between operation modes made in the standby time T3 such that a switch between the electric power generation mode and the electric power saving mode is not continuously repeated. The standby time T3 can be randomly set in accordance with the functions and specifications of the vehicle or a performance requisite for the vehicle-mounted solar power generation device 1. Note that, the length of the standby time T3 may be equal to the lengths of the standby time T1 and the standby time T2 and may be different from the lengths of the standby time T1 and the standby time T2.

In a case where the standby time T3 has elapsed (S403: YES), the process proceeds to step S204. In a case where the standby time T3 has not elapsed (S403: NO), the process proceeds to step S201.

In the case of the above-described process, it is possible to restrain a switch between the electric power generation mode and the electric power saving mode from being made frequently and consecutively based on the state of stoppage of the vehicle even in a case where the solar panel 10 is under the weak-light environment.

Operation and Effect

As described above, in the case of the vehicle-mounted solar power generation device 1 according to the embodiment of the present disclosure, in the electric power generation mode, determination on whether to switch to the electric power saving mode is made based on the output voltage of the solar panel 10 and in the electric power saving mode, determination on whether to switch to the electric power generation mode is made based on any of the number of times of switching from the electric power generation mode to the electric power saving mode, the amount of electric power stored in the solar battery 20, and the state of stoppage of the vehicle in addition to the output voltage of the solar panel 10.

In addition, a switch from the electric power saving mode to the electric power generation mode is made in a case where the controller 30 determines that the number of times of transition to the electric power saving mode made within the certain time period t is smaller than the predetermined number γ and that the solar panel voltage is equal to or greater than the threshold value β and in a case where the controller 30 determines that the number of times of transition to the electric power saving mode made within the certain time period t is equal to or greater than the predetermined number γ, the electric power saving mode is continued until the standby time T1 elapses after the determination. Accordingly, it is possible to restrain a switch between the electric power generation mode and the electric power saving mode from being made frequently and consecutively based on the number of times of transition to the electric power saving mode even in a case where the solar panel 10 is under the weak-light environment.

Alternatively, in a case where the controller 30 determines that the amount of electric power stored in the solar battery 20 exceeds the predetermined amount δ and that the solar panel voltage is equal to or greater than the threshold value β, a switch from the electric power saving mode to the electric power generation mode is made and in a case where the controller 30 determines that the amount of electric power stored in the solar battery 20 is equal to or smaller than the predetermined amount δ, the electric power saving mode is continued until the standby time T2 elapses after the determination. Accordingly, it is possible to restrain a switch between the electric power generation mode and the electric power saving mode from being made frequently and consecutively based on the amount of electric power stored in the solar battery 20 even in a case where the solar panel 10 is under the weak-light environment.

Alternatively, a switch from the electric power saving mode to the electric power generation mode is made in a case where the controller 30 determines that the vehicle is not in a stopped state for the predetermined time or more under a situation in which the solar panel 10 does not generate electric power and that the solar panel voltage is equal to or greater than the threshold value β and in a case where the controller 30 determines that the vehicle is in a stopped state for the predetermined time or more under a situation in which the solar panel 10 does not generate electric power, the electric power saving mode is continued until the standby time T3 elapses after the determination. Accordingly, it is possible to restrain a switch between the electric power generation mode and the electric power saving mode from being made frequently and consecutively based on the state of stoppage of the vehicle even in a case where the solar panel 10 is under the weak-light environment.

In the electric power generation mode, a switch from the electric power generation mode to the electric power saving mode is made in a case where the controller 30 determines that the solar panel voltage is equal to or lower than the threshold value α. Therefore, it is possible to avoid the solar battery 20 being inefficiently charged and to prevent a decrease in amount of electric power stored in the solar battery 20.

The embodiment of the present disclosure can be used for a vehicle-mounted solar power generation device that uses electric power generated in a solar panel of a vehicle or the like.

What is claimed is:

1. A vehicle-mounted solar power generation device comprising:
   a solar panel;
   a solar battery that is a battery temporarily storing electric power; and
   a controller configured to perform control by switching between an electric power generation mode in which the solar battery is charged with a generated electric power of the solar panel and an electric power saving mode in which at least the charging of the solar battery is stopped such that power consumption is suppressed in comparison with the electric power generation mode, wherein:
   the controller determines to switch between modes based on an output voltage of the solar panel; and
   in the electric power saving mode, the controller restricts a switch to the electric power generation mode based on a state of stoppage of a vehicle that includes a case where the vehicle is stopped and parked at a garage with a roof and a case where the vehicle and a house are vehicle-to-home connected to each other such that electric power stored in the solar battery is supplied to the house.

2. The vehicle-mounted solar power generation device according to claim 1, wherein, in the electric power saving mode, the controller restricts a switch from the electric power saving mode to the electric power generation mode in a case where the amount of electric power stored in the solar battery is equal to or smaller than a predetermined amount or in the case where the output voltage of the solar panel is lower than the predetermined first threshold value.

3. The vehicle-mounted solar power generation device according to claim 2, wherein, in a case where the controller determines that the amount of electric power stored in the solar battery is equal to or smaller than the predetermined amount the electric power saving mode, the controller continues the electric power saving mode until a predetermined second standby time elapses after the determination.

4. The vehicle-mourned solar power generation device according to claim 1, wherein, in the electric power saving mode, the controller restricts a switch from the electric power saving mode to the electric power generation mode in a case where the vehicle is in a state of being stopped in a predetermined operation mode or in the case where the output voltage of the solar panel is lower than the predetermined first threshold value.

5. The vehicle-mounted solar power generation device according to claim 4, wherein, in a case where the controller determines that the vehicle is in a state of being stopped in the predetermined operation mode, the controller continues the electric power saving mode until a predetermined third standby time elapses after the determination.

6. The vehicle-mounted solar power generation device according to claim 1, wherein, in a case where the controller determines that the output voltage of the solar panel is equal to or lower than a predetermined second threshold value in the electric power generation mode, the controller performs a switch from the electric power generation mode to the electric power saving mode.

* * * * *